US010027796B1

(12) United States Patent
Almog et al.

(10) Patent No.: US 10,027,796 B1
(45) Date of Patent: Jul. 17, 2018

(54) SMART REMINDER GENERATION FROM INPUT

(71) Applicant: Microsoft Technology Licensing, LLC, Redmond, WA (US)

(72) Inventors: Itai Almog, Redmond, WA (US); Fan Zhong, Redmond, WA (US); Nick Barnwell, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/469,107

(22) Filed: Mar. 24, 2017

(51) Int. Cl.
*H04M 1/725* (2006.01)
*H04W 4/12* (2009.01)

(52) U.S. Cl.
CPC ... *H04M 1/72597* (2013.01); *H04M 1/72547* (2013.01); *H04W 4/12* (2013.01)

(58) Field of Classification Search
CPC ......... H04M 1/72597; H04M 1/72547; H04M 1/72519; H04M 1/72572; H04M 2250/22; H04M 1/72522; H04M 3/42; H04M 1/274575; H04M 1/575; H04W 4/12; H04W 84/042; H04W 84/12; H04W 4/008; G06F 3/04883; G06F 3/04847; G06F 3/0482; G08B 21/24; G06Q 10/10; H04Q 2213/1305; H04Q 2213/13098; H04Q 2213/13103; H04L 51/24
USPC ............ 455/412.2, 414.1; 705/7.21; 345/173
See application file for complete search history.

(56) References Cited

U.S. PATENT DOCUMENTS

| 7,647,042 B2 * | 1/2010 | Willey ............ H04M 1/274575 |
| | | 455/412.2 |
| 8,145,274 B2 | 3/2012 | Gandhi et al. |
| 8,548,449 B2 | 10/2013 | Axelrod et al. |
| 9,183,281 B2 | 11/2015 | Cheng et al. |
| 9,288,616 B2 | 3/2016 | Cherry et al. |

(Continued)

FOREIGN PATENT DOCUMENTS

| EP | 1111884 A2 * | 6/2001 | ............ H04M 1/575 |
| GB | 2423440 A * | 8/2006 | ............ H04M 1/642 |

OTHER PUBLICATIONS

Sinkov, Andrew, "Evernote", https://blog.evernote.com/blog/2014/12/04/questions-answers-context-2/, Published on: Dec. 4, 2014, 14 pages.

(Continued)

*Primary Examiner* — Mahendra Patel

(57) ABSTRACT

Smart reminders are generated from input according to lexical and contextual cues. The input may be entered into any suitable application via any suitable electronic device. The input may be processed by a natural language processor to determine whether to convert the input into a smart reminder. In this way, the input of the note may be parsed to identify entities, such as entities associated with one or more people, relevant time(s), action(s), instruction(s), etc., for creating the smart reminder. The identified entities may then be used as triggers for displaying the smart reminder at an appropriate time to a user. A trigger such as detecting a person associated with the input, e.g., by receiving an incoming call from the person, connecting to the same network as the person, receiving a text from the person, or detecting the voice of the person, may cause the smart reminder to be displayed.

20 Claims, 13 Drawing Sheets

(56) References Cited

U.S. PATENT DOCUMENTS

| | | | | |
|---|---|---|---|---|
| 2001/0029194 | A1* | 10/2001 | Ketola | H04M 1/575 455/567 |
| 2003/0063732 | A1* | 4/2003 | Mcknight | H04M 1/2745 379/210.01 |
| 2006/0061488 | A1* | 3/2006 | Dunton | G06Q 10/109 340/988 |
| 2006/0141926 | A1* | 6/2006 | Anttilla | H04M 1/663 455/3.06 |
| 2007/0004383 | A1* | 1/2007 | Agozo | H04M 1/72566 455/414.1 |
| 2007/0238453 | A1* | 10/2007 | Chang | H04L 51/24 455/421 |
| 2008/0010084 | A1 | 1/2008 | Castro et al. | |
| 2009/0106247 | A1* | 4/2009 | Daughtry | G06F 21/604 |
| 2010/0245563 | A1* | 9/2010 | Golovchinsky | H04N 7/18 348/135 |
| 2012/0123786 | A1* | 5/2012 | Valin | G06Q 20/105 704/273 |
| 2013/0324093 | A1* | 12/2013 | Santamaria | H04M 1/72519 455/414.1 |
| 2014/0074534 | A1* | 3/2014 | Hamilton | G06Q 10/10 705/7.19 |
| 2015/0081601 | A1 | 3/2015 | Ayzenshtat et al. | |
| 2017/0124527 | A1* | 5/2017 | Traina | H04N 5/775 |

OTHER PUBLICATIONS

Sohn, et al., "Place-Its: Location-Based Reminders on Mobile Phones", In Proceedings of 7th International Conference on Ubiquitous Computing, Sep. 11, 2005, 18 pages.

Pnevmatikakis, et al., "D5.3: Context Aware Reminders", In Proceedings of 7th Framework Programme, Mar. 3, 2011, 25 pages.

Rich, Jason, "Making the Most of Reminders and Notes in OS X Mountain Lion", http://www.quepublishing.com/articles/article.aspx?p=1946750&seqNum=3, Published on: Oct. 12, 2012, 5 pages.

* cited by examiner

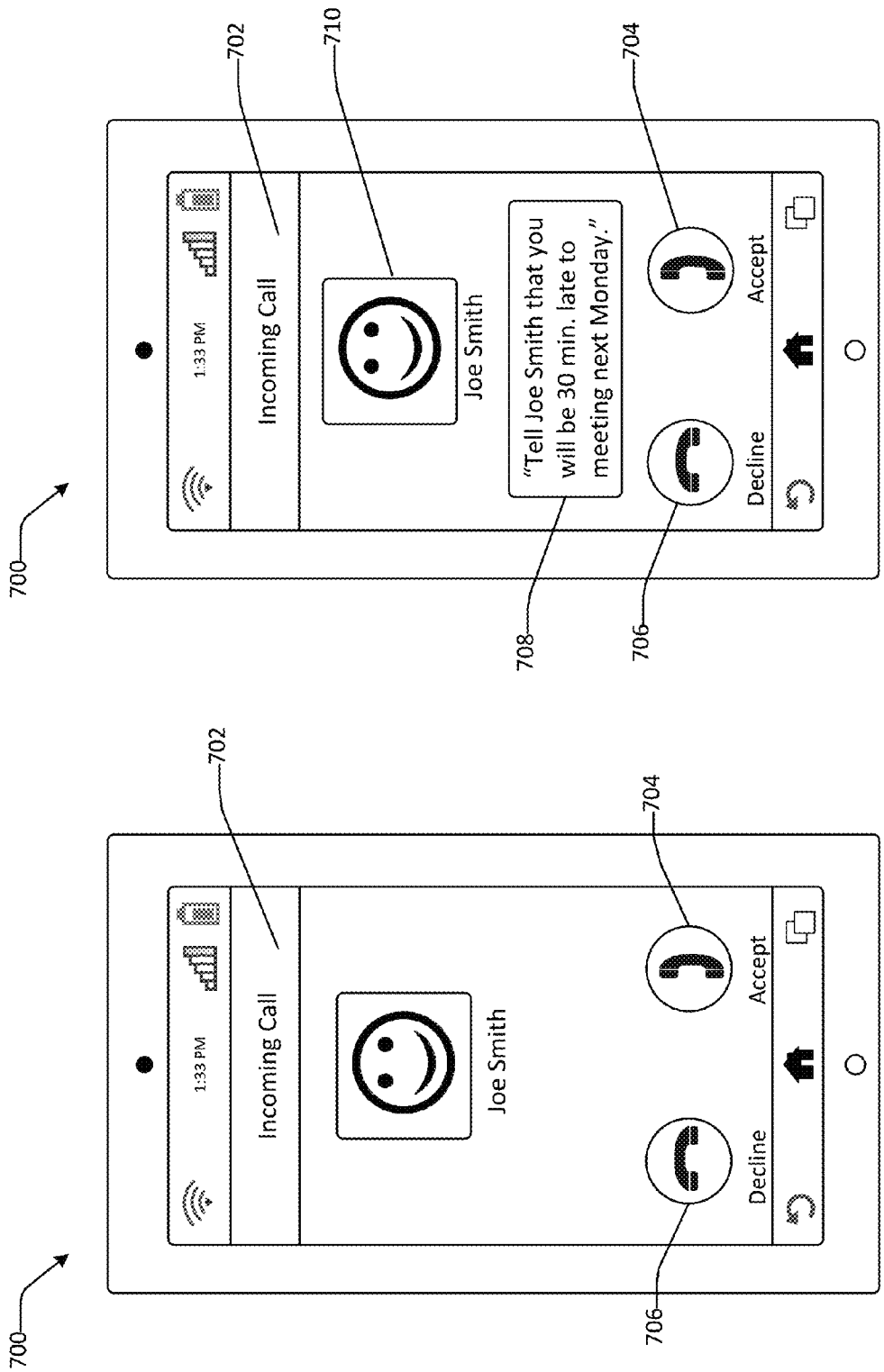

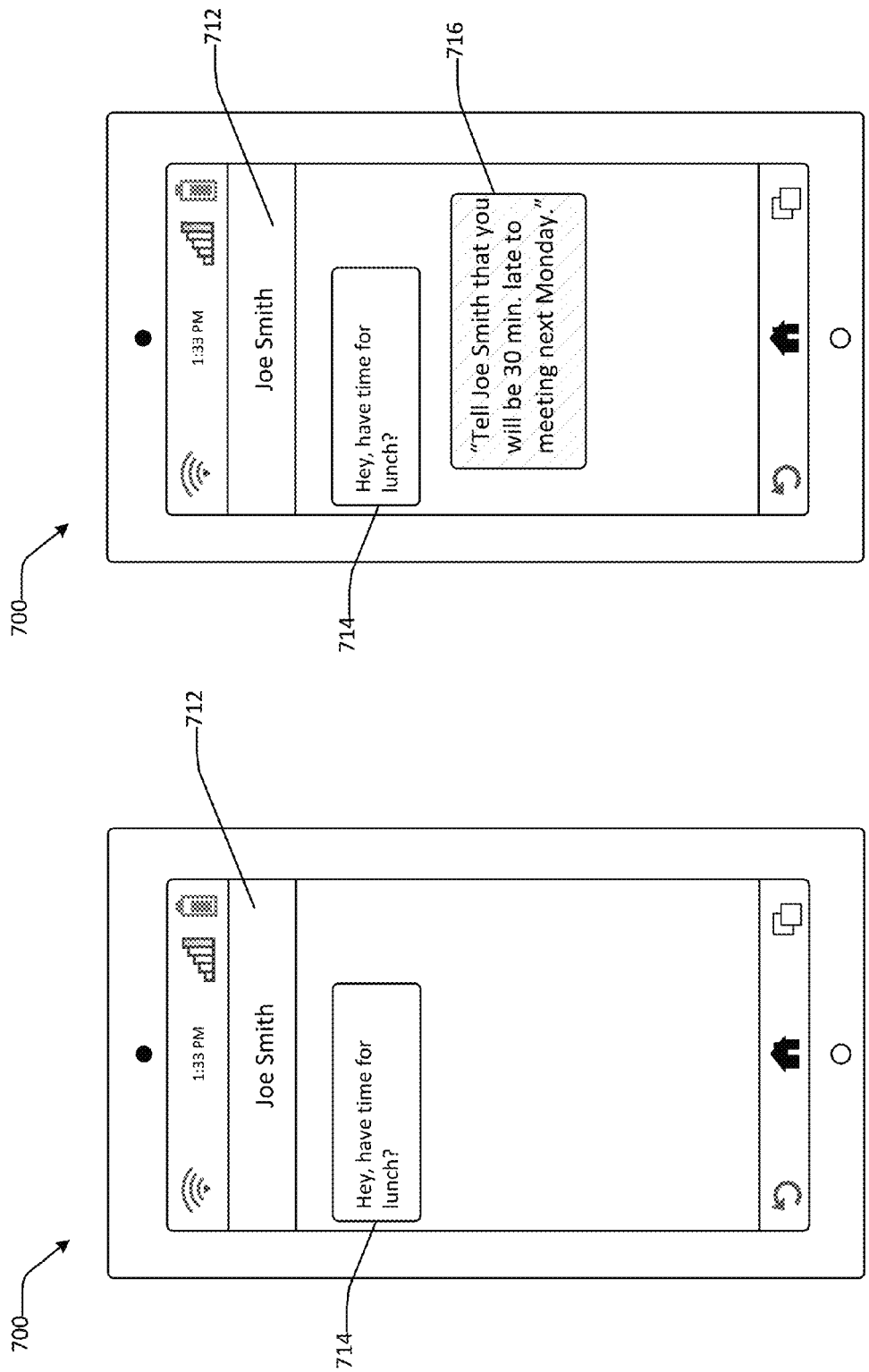

SMART REMINDER GENERATION FROM INPUT

BACKGROUND

It is commonplace for people to jot down notes, either electronically or manually, as reminders during their daily lives. However, often times they cannot easily locate the notes they have taken and, as a result, fail to act upon the notes. This defeats the purpose of a note, which is to remind people of things they want to do. If people cannot locate notes and reminders efficiently and reliably, then the chances of forgetting a work task or missing a deadline increase. Although several current applications allow people to take notes and set manual reminders, current reminder systems do not provide for autonomous reminders based on outgoing and incoming phone calls, device proximity, and voice identification triggers.

In order to build productive habits, people need triggers to remind them to act in accordance with their desired behavior. Currently, people use timers, alarms, and sticky notes, among other things, as triggers. However, setting the timer, setting the alarm, and writing on the sticky note not only consume time during the day but are also unreliable. For example, if the sticky note is accidentally thrown away, there is no way to recreate the trigger, unless the person re-remembers the content of the sticky note. Furthermore, if a person does not read the sticky note at the appropriate time, then the person may forget to take the specified action at the specified time. For example, if a person wrote on a sticky note "Remember to tell Sarah about the design meeting," and then failed to see the sticky note before the person's next encounter with Sarah, that person may forget to tell Sarah about the design meeting. Similarly, if a person does not view an electronic note at an appropriate time, the person will likely forget to do the action specified by the electronic note.

It is with respect to these and other general considerations that example aspects, systems, and methods have been described. Also, although relatively specific problems have been discussed, it should be understood that the examples should not be limited to solving the specific problems identified in the background.

SUMMARY

The disclosure generally relates to a system and methods for creating smart reminders from user input according to lexical and contextual cues. The input may be entered via any suitable application, e.g., a note-taking application, a task application, a calendar application, etc., associated with any suitable electronic device, e.g., mobile phone, tablet, personal computer, etc. The input may be received by the electronic device as spoken input, keyboard input, touch/stylus input, etc. Upon receipt, the input may be processed to determine whether to convert the input into a smart reminder. For instance, the input may be analyzed by natural language processing using topic segmentation, feature extractions, domain classification, semantic determination, or any other method currently known or developed. In this way, the input may be parsed by identifying entities to create a "smart reminder," where entities may include one or more people, relevant time(s), action(s), location(s), meeting(s), instruction(s), etc., for creating the smart reminder. The identified entities may then be used as triggers for displaying the smart reminder at an appropriate time to a user. For instance, triggers such as detecting a person, e.g., by detecting an incoming call from the person, connecting to the same network as a device associated with the person, receiving a text message from the person, or detecting the nearby voice of the person, may cause the smart reminder to be displayed to the user.

In an aspect, a computer-implemented method of creating a smart reminder is provided. The method includes receiving an input on a device and processing the input to identify one or more entities associated with the input, where at least one entity is associated with a person. Based at least in part on the processed input, the method further includes generating the smart reminder. Additionally, the method includes detecting at least one triggering event associated with the smart reminder, where detecting the triggering event includes detecting the person, and providing the smart reminder on a display of the device.

In another aspect, a computing device that includes a processing unit and a memory storing computer-executable instructions that when executed by the processing unit cause the computing device to perform a number of operations. The operations include receiving an input and processing the input to identify one or more entities associated with the input, where at least one entity is associated with a person. Based at least in part on the processed input, the operations further include generating the smart reminder. Additionally, the operations include detecting at least one triggering event associated with the smart reminder, where detecting the triggering event includes detecting a communication associated with the person, and providing the smart reminder on a display of the computing device.

In yet another aspect, a computer-readable storage medium storing computer-executable instructions that when executed by a processing unit perform a method is provided. The method includes receiving an input on a device and processing the input to identify one or more entities associated with the input, where at least one entity is associated with a person. Based at least in part on the processed input, the method further includes generating the smart reminder. Additionally, the method involves detecting at least one triggering event associated with the smart reminder, where detecting the triggering event includes detecting the person, and providing the smart reminder on a display of the device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 7A-7D illustrate examples of an application responding to a smart reminder triggering event associated with an incoming call or an incoming text.

DETAILED DESCRIPTION

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

As detailed above, the disclosure generally relates to a system and methods for creating smart reminders from user input according to lexical and contextual cues. The input may be entered via any suitable application, e.g., a note-taking application, a task application, a calendar application, etc., associated with any suitable electronic device, e.g., mobile phone, tablet, personal computer, etc. In some examples, a smart reminder may be composed within the Microsoft® Sticky Notes™ application. The input may be received by the electronic device as spoken input, keyboard input, touch/stylus input, etc. Upon receipt, the input may be processed to determine whether to convert the input into a smart reminder. For instance, the input may be analyzed by natural language processing using topic segmentation, feature extractions, domain classification, and/or semantic determination. In this way, the input of the note may be parsed to identify entities, such as one or more people, relevant time(s), action(s), location(s), meeting(s), instruction(s), etc., for creating the smart reminder. The identified entities may then be used as triggers for displaying the smart reminder at an appropriate time to a user. For instance, triggers such as detecting a person, e.g., by detecting an incoming call from the person, connecting to the same network as a device associated with the person, receiving a text message from the person, or detecting the nearby voice of the person, may cause the smart reminder to be displayed to the user.

Figure 1:
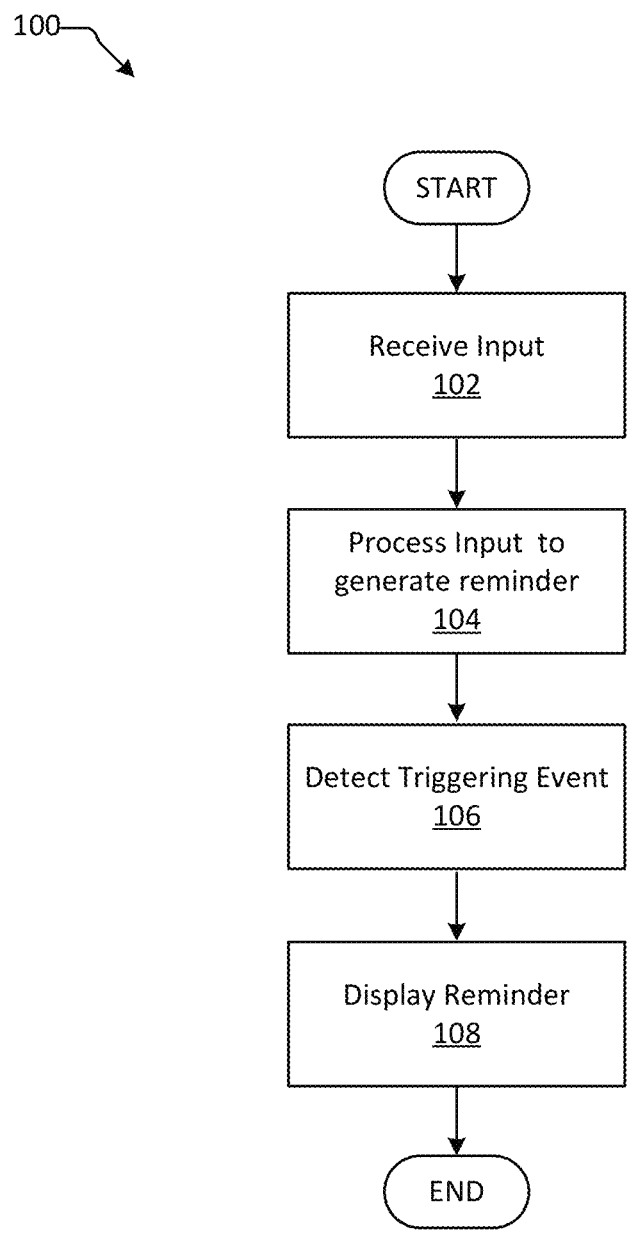
FIG. 1 is a block diagram illustrating a lifecycle of a smart reminder.

FIG. 1 is a block diagram illustrating a lifecycle of a smart reminder. The lifecycle of a smart reminder may be initiated with raw input. In some cases, a user may launch a specific application for creating smart reminders from input on an electronic device. In other cases, the user may launch any suitable application that accepts input, e.g., a note-taking application, task application, calendar application, messaging application, etc. In aspects, input may include a string of characters and/or words, which may or may not include punctuation or other grammatical constructs. The application may receive the input at operation 102 through a variety of input channels. In some example aspects, a user may enter the input by typing on a physical or virtual keyboard. In other example aspects, a user may enter the input by speaking. In further aspects, a user may enter input by using a stylus or finger to draw on a touch-screen surface, such as a tablet or mobile phone. In further aspects, receive input operation 102 may involve any combination of text-based, speech-based, and/or stylus-based input.

Figure 2:
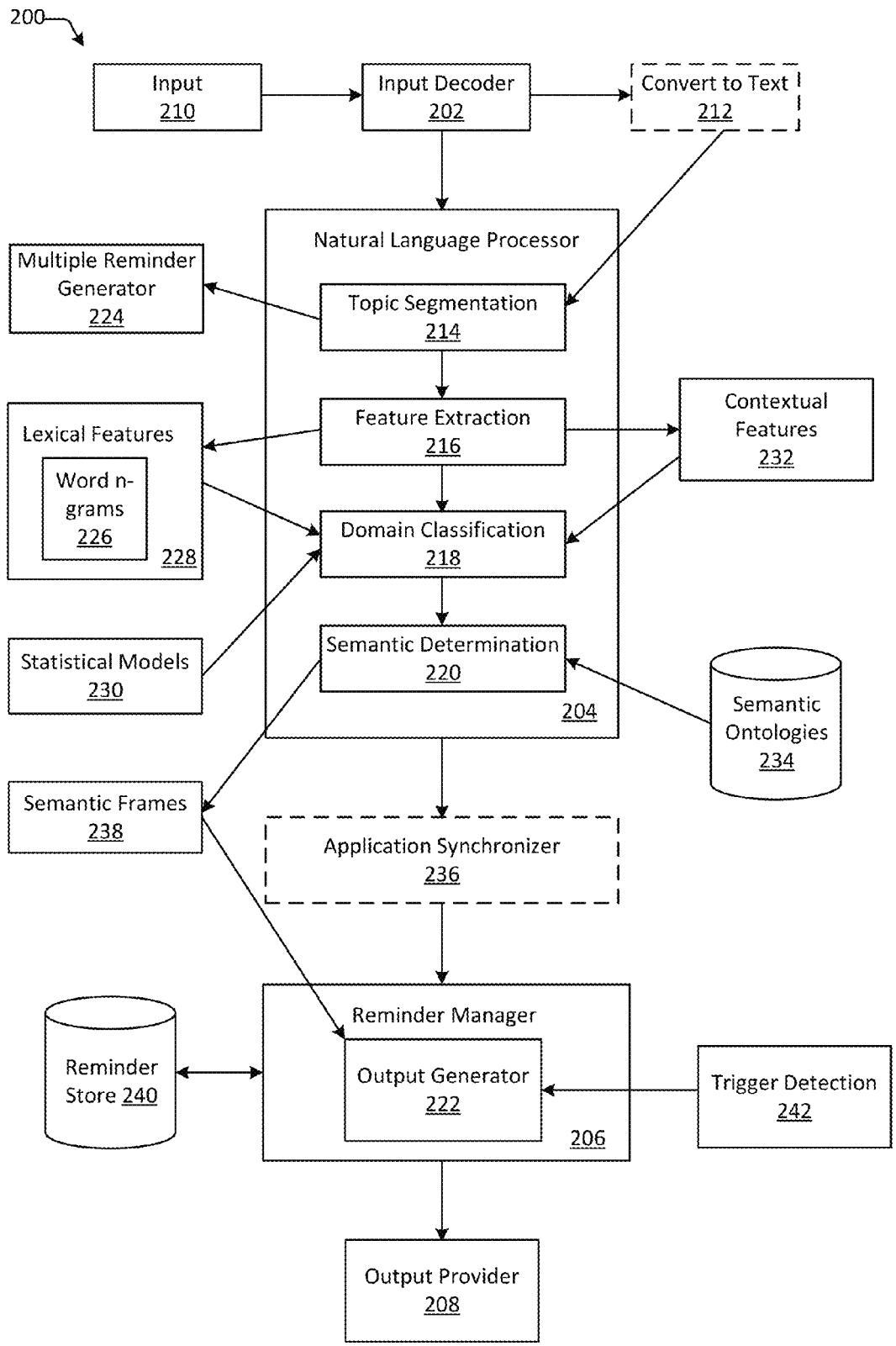
FIG. 2 is a block diagram illustrating a method for creating and processing a smart reminder.

At process operation 104, if necessary, the input may be converted to text. For example, if input is received as speech input, a speech-to-text system (e.g., via Cortana®) may convert the speech to text. Alternatively, if the input is received as handwritten input (e.g., via touch or stylus), a handwriting-to-text system may convert the stylus or touch input from handwriting to text. After converting the input to text, if necessary, the input may then be further processed by utilizing natural language processing technology. In some example aspects, process operation 104 may include comparing historical data regarding the user. In other aspects, the process operation 104 may meticulously isolate key words and phrases to identify entities associated with the input. An entity may include any discrete item associated with the input, including third-party applications, specific people or contacts, events, meetings, times, instructions, and other data that may be stored locally on the electronic device or remotely on a cloud server. FIG. 2 provides a more detailed description of the process operation 104. In some aspects, processing the input and identifying entities may result in creating a smart reminder.

For example, at receive input operation 102, a user may provide speech input to a mobile device of: "Tell Kim about the rescheduled innovation meeting." At process operation 104, the speech input may be converted to text and a natural language processing application may process the input. For instance, the natural language processing application may identify the term "Kim" as a person entity. Further, the system may determine "which" Kim is referenced by evaluating the phrase "innovation meeting" with reference to the user's calendar. If the user has meetings entitled "innovation meeting" with a co-worker named Kim Baxter, the application may determine with a reasonable likelihood that the term "Kim" from the input refers to a person entity named "Kim Baxter" who is a work contact. Based on the processed input, a smart reminder may be generated. In aspects, the smart reminder may be a notification including the input (e.g., "Tell Kim about the rescheduled innovation meeting") and associated with one or more identified entities. In this case, the smart reminder generated from the input is associated with a person entity, "Kim Baxter," which entity may serve as a trigger for the smart reminder.

At detect triggering event 106, a trigger associated with the smart reminder may be detected. In aspects, a smart reminder may have one or more triggers and each trigger may be associated with an identified entity. For example, as detailed above, an entity associated with "Kim Baxter" may serve as a trigger for the smart reminder. Additionally, another entity such as "innovation meeting" associated with the input may serve as a trigger for the smart reminder. In this case, when an electronic device detects Kim Baxter, the smart reminder may be triggered and display the input on the screen of an electronic device.

In a first example, when a call is received from Kim Baxter, the smart reminder, e.g., "Tell Kim about the rescheduled innovation meeting," may appear on the screen of a mobile device. In this way, the user may be reminded to tell Kim about a new date and/or time for the innovation meeting while the user is on the phone call with Kim. In another example, a text may be received from Kim Baxter on a mobile device. Upon receipt of the text, the smart reminder, e.g., "Tell Kim about the rescheduled innovation meeting," may appear on the screen of a mobile device. In still other example aspects, a smart reminder may be triggered by detecting a device associated with Kim Baxter. For example, the user may be connected to the same Wi-Fi network as a device associated with Kim Baxter. In some example aspects, when the system detects that an electronic device of a user and an electronic device of Kim Baxter are connected to the same Wi-Fi network, that simultaneous connection may serve as a triggering event at detect triggering event operation 106. Alternatively, an electronic device of the user may detect that an electronic device of Kim Baxter is nearby by utilizing signals, such as Bluetooth signals. If an electronic device of a user is listening to Bluetooth signals and a nearby electronic device of Kim is transmitting Bluetooth signals, then the electronic device of the user may capture the Bluetooth signals from the electronic device of Kim. This exchange of signals may constitute a triggering event that is detected by the electronic device of a user at detect triggering event operation 106. In still further aspects, a user may unexpectedly bump into Kim Baxter. For example, the electronic device of the user may detect a voice in conversation with the user. The electronic device of the user may then leverage voice recognition technology to determine that the voice is that of Kim Baxter. The detection of Kim Baxter's voice may constitute a triggering event that is detected by the electronic device of a user at detect triggering event operation 106. As should be appreciated, any number of triggering events may be detected based on triggers associated with a smart reminder, e.g., a time of day, a meeting occurrence, a location, etc.

At display operation 108, the system may respond to the detect triggering event operation 106. For example, when the system detects that Kim Baxter is nearby, the system may respond to the triggering event by displaying the smart reminder on the screen, similar to a pop-up reminder. In some example aspects, when a user receives a call from Kim Baxter, before the user answers the phone, a smart reminder associated with Kim may pop-up on the screen. Similarly, when a system detects that a device associated with Kim Baxter is connected to the same network as the device of the user, the user may be notified that Kim is nearby and the smart reminder may be displayed to the user.

Once the display reminder operation 108 has presented the smart reminder to the user, the user may have the option of dismissing the smart reminder. Dismissing the smart reminder may close the current reminder but may preserve it for subsequent triggering events. This may be useful if a user desires to view the smart reminder again at a later time. In other example aspects, a user may have the option of completing or deleting the smart reminder.

As should be appreciated, operations 102-108 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIG. 2 is a block diagram illustrating a method for creating and processing a smart reminder. Method 200 begins with input 210. As described in FIG. 1, the lifecycle of a smart reminder begins with an input. The input may consist of textual input, speech input, handwritten input, and other various types of input. Once the input is received, the input 210 may be sent to input decoder 202.

Input decoder 202 may determine if the input should be converted to text. If an input, such as a non-textual input like speech input and/or handwriting input, should be converted to text, the input decoder 202 may send the input 210 to convert to text operation 212, where the input may be converted to text for processing.

In some example aspects, the input may be textual and may avoid the convert to text operation 212. As a result, the textual input may be sent from the input decoder 202 to the natural language processor 204 for processing. In other example aspects, the input may not be textual and be sent to the convert to text operation 212. The convert to text operation 212 may convert the input to text and subsequently send the converted textual input to the natural language processor 204 for further processing.

Once the converted textual input is sent to the natural language processor 204, the natural language processor 204 may disassemble the textual input and parse the text. The text may be converted into semantic representations that may be understood and processed by a machine.

In some aspects, the natural language processor 204 may begin with a topic segmentation component 214. The topic segmentation component may analyze the textual input for contextual cues and key words. The topic segmentation component 214 may then isolate those key words and associate them with general topics that may be preloaded into the natural language processor 204. For example, a textual input may include the following phrase: "Don't forget to tell Kim about the design meeting." The topic segmentation component 214 may isolate the name "Kim" and the object "design meeting." The topic segmentation component 214 may then associate "Kim" with a person entity and associate "design meeting" with a calendar entity.

In some example aspects, a user may desire to create multiple smart reminders. If an input is particularly long, the topic segmentation component 214 may send the converted textual input to the multiple reminder generator operation 224 to determine if the input should be divided into separate smart reminders. To determine if an input should be divided into separate smart reminders, the multiple reminder generator operation 224 may analyze a length of time between inputting of each word. For example, if a smart reminder was created using speech-to-text, then the multiple reminder generator operation 224 may consider pauses between words and phrases. In some example aspects, if a long duration is detected between two phrases, then the multiple reminder generator operation 224 may divide the input into two or more separate reminders. In other example aspects, the multiple reminder generator operation 224 may analyze the topic segmentation from operation 214. For example, if several topics are detected in the textual input, then the multiple reminder generator operation 224 may attempt to divide the input into multiple reminders according to topic.

In further example aspects, the topic segmentation component 214 may consider textual commands (e.g., "new note" or "create new"). In the event that the topic segmentation component 214 detects a textual command associated with creating a new note, the topic segmentation component 214 may send the textual input to the multiple reminder generator operation 224.

After the textual input is analyzed by the topic segmentation component 214, the textual input may then be analyzed by the feature extraction component 216. The feature extraction component may extract lexical features 228 and contextual features 232 from the textual input for use by the domain classification component 218. The lexical features 228 that may be analyzed in the feature extraction component 216 may include, but are not limited to, word n-grams 226. A word n-gram is a contiguous sequence of n words from a given sequence of text. The contextual features 232 that may be analyzed by the feature extraction component 216 may include, but are not limited to, a top context and an average context. A top context may be a context that is determined by comparing the topics and key words of the textual data with a set of preloaded contextual cues. An average context may be a context that is determined by comparing the topics and key words of historical smart reminders, emails, text messages, and other data. The feature extraction component 216 may also skip contextually insignificant inputs when analyzing the textual input.

After the feature extraction component 216 extracts the lexical features 228 and contextual features 232 of the textual input, the textual input may be sent to the domain classification component 218. The domain classification component 218 analyzes the lexical features 228 and the contextual features 232 that were previously extracted. The domain classification component 218 may also consider statistical models 230 when determining the proper domain to be associated to the smart reminder. In some example aspects, the domain classification component 218 may be trained using a statistical model or policy (i.e., prior knowledge, historical datasets) with previous textual inputs collected by a single-user system. For example, a textual input about a "design meeting" may be associated with a "work" domain. The "design meeting" may also be associated with a social domain that includes the members that attended the meeting or will attend the meeting (if the meeting has not occurred).

After proper domains are assigned to the textual input by the domain classification component 218, the textual input may then be sent to the semantic determination component 220. The semantic determination component converts the textual input into a domain-specific semantic representation based on the domain that was assigned to the textual input by the domain classification component 218. The semantic determination component 220 may draw on specific sets of concepts and categories from a semantic ontologies database 234 to accurately determine the intent of the user regarding the smart reminder. For example, the semantic determination component 220 may determine an action a user wants to take. For example, if a user enters "Don't forget to tell Kim about the design meeting," the phrase "Don't forget to tell" may indicate that the user desires to be reminded "to tell" something. The key words "Kim" and "design meeting" may have previously been assigned domains by the domain classification component 218, and as a result, the semantic determination component 220 may then determine that the user specifically intends to be reminded to tell Kim from work (e.g., specific contact "Kim Baxter") about a previous meeting named "design meeting" found in the calendar application of the device of the user.

In other example aspects, the semantic determination component 220 may have pre-defined semantic frames 238 associated with a user's intent to extract certain information from another application. For example, a user may input, "Remember to check movie times for Tarzan for movie date with Sarah." The semantic determination component 220 may determine that the user intends to search for information about movies. Search information that may be pre-defined by the semantic frames 238 may include, but is not limited to, directors, actors, genres, release dates, and ratings.

After the natural language processor 204 has completed its analysis of the textual input, the textual input may be sent to the application synchronizer 236. The application synchronizer 236 may connect the textual input with third-party applications. For example, a textual input for a smart reminder may say "Don't forget to make dinner reservation for anniversary." After going through the natural language processor 204, the system may have determined that the "anniversary" is an upcoming wedding anniversary between the user and a significant other. If the device of the user detects the significant other, e.g., the user receives an incoming call from the significant other, a smart reminder may be triggered and display on the screen of the device of the user. In addition, the smart reminder may prompt the user to create a dinner reservation and may provide access to a third-party application, such as OpenTable® or a website of the significant other's favorite restaurant. The option to transition from the calling screen to the OpenTable® or other application may be generated by the application synchronizer 236. Alternatively, a textual input may not implicate a third-party application. In such an event, the textual input data may be sent directly to the reminder manager 206.

The reminder manager 206 may prepare the smart reminder for display. The reminder manager 206 may also be responsible for saving the smart reminder for subsequent data analysis in the natural language processor 204. The reminder manager 206 may store smart reminders in the reminder store 240. The reminder store 240 may be located locally on the device of the user, remotely (e.g., server or distributed cloud environment), or as a combination of both local and remote storage locations.

In aspects, the reminder manager 206 may receive triggers from trigger detection operation 242. Similar to detect triggering event 106, trigger detection operation 242 may detect various triggering events that cause the smart reminder to display on the device of the user. For example, a triggering event may include an incoming call from a person associated with a specific smart reminder. Upon receiving an incoming call from that person, the associated smart reminder may display on the device. The reminder manager 206 may also include the output generator component 222. The output generator component 222 may prepare the smart reminder for display. For example, a smart reminder that said "Don't forget to tell Kim about the design meeting" may be triggered upon receiving an incoming call from Kim. However, the smart reminder may be displayed as "Don't forget to tell Kim about the design meeting from last Thurs. afternoon." That is, in some aspects, the output generator 222 may append additional information to the smart reminder to better assist the user in remembering exactly when the design meeting occurred. Another example may include a smart reminder that says "Don't forget to remind Joe to pick up Grandma from the airport." If a user receives an incoming call from Joe, the smart reminder may be triggered and displayed on the screen. However, in the event that Grandma's flight is delayed, the smart reminder may display as follows: "Don't forget to remind Joe to pick up Grandma from airport. Flight delayed 1 hr." In this case, for example, after the textual input of the smart reminder was synchronized with at least one third-party application by the application synchronizer 236 (e.g., appropriate airline), the output generator 222 may pull information from that third-party application prior to displaying the smart reminder upon a triggering event. For example, the output generator 222 may have obtained third-party data about the flight status of Grandma's plane and then appended that data to the smart reminder prior to display.

After any additional data has been gathered and the smart reminder has been prepared for output by the reminder manager 206, the output provider 208 generates a smart reminder on the screen of a device of a user. In some example aspects, the display of the smart reminder may be a large text box reminder. In other example aspects, the display of the smart reminder may be a small banner reminder at the top of the screen of a device. In further aspects, the smart reminder may be displayed by a small smart reminder icon in the header or footer areas of a screen of a device. Other device feedback mechanisms may be associated with a smart reminder. For example, upon triggering a smart reminder, the device displaying the smart reminder may vibrate. In other example aspects, a sound may be associated with the display of a smart reminder. That is, any suitable method for displaying a smart reminder may be implemented by an electronic device of a user.

As should be appreciated, the various methods, devices, components, etc., described with respect to FIG. 2 are not intended to limit system 200 to being performed by the particular components described. Accordingly, additional topology configurations may be used to practice the methods and systems herein and/or components described may be excluded without departing from the methods and systems disclosed herein.

Figure 3:
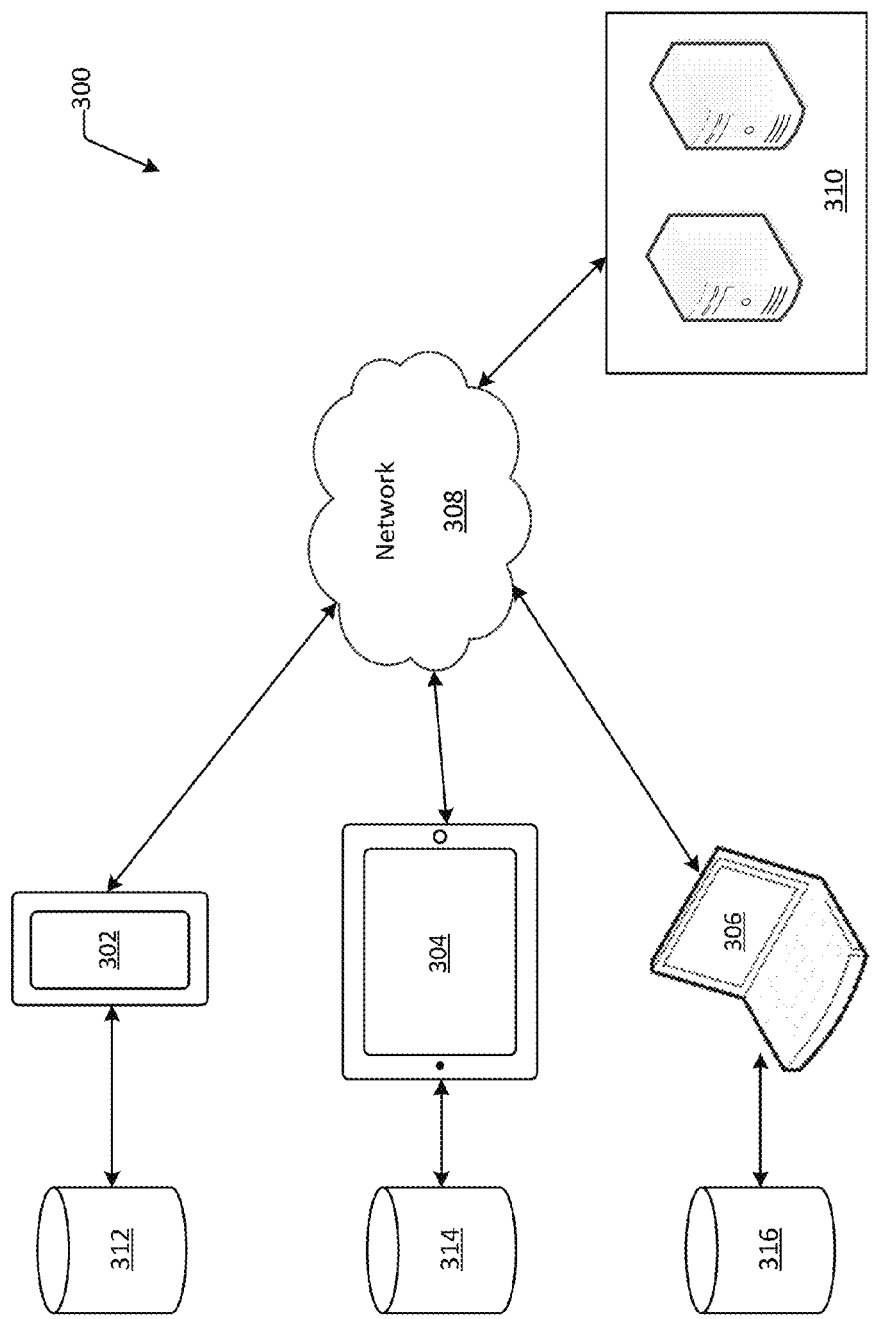
FIG. 3 illustrates a system for receiving and storing data on local and remote databases over a network.

FIG. 3 illustrates a system for receiving and storing data on local and remote databases over a network. An application that facilitates the creation, processing, and displaying of a smart reminder may be run on an electronic device including, but not limited to, a mobile phone 302, a tablet 304, and a personal computer 306. During the processing stage of the smart reminder, the electronic device may utilize local data stored in a local database, remote data stored on servers 310, or a combination of both. For example, mobile phone 302 may utilize local database 312 and network 308 to process input for a smart reminder. In other example aspects, tablet 304 may utilize local database 314 and network 308 to synchronize a smart reminder across all devices registered to a single user. For example, a user may own tablet 304 and personal computer 306. If the initial smart reminder is created on tablet 304, the smart reminder may be saved locally in database 314, but also shared with the personal computer 306 via the network 308. Once the personal computer 306 receives the smart reminder synchronization, the personal computer 306 may store the smart reminder in the local database 316 associated with the personal computer 306.

As should be appreciated, the various methods, devices, components, etc., described with respect to FIG. 3 are not intended to limit systems 300 to being performed by the particular components described. Accordingly, additional topology configurations may be used to practice the methods and systems herein and/or components described may be excluded without departing from the methods and systems disclosed herein.

Figure 4:
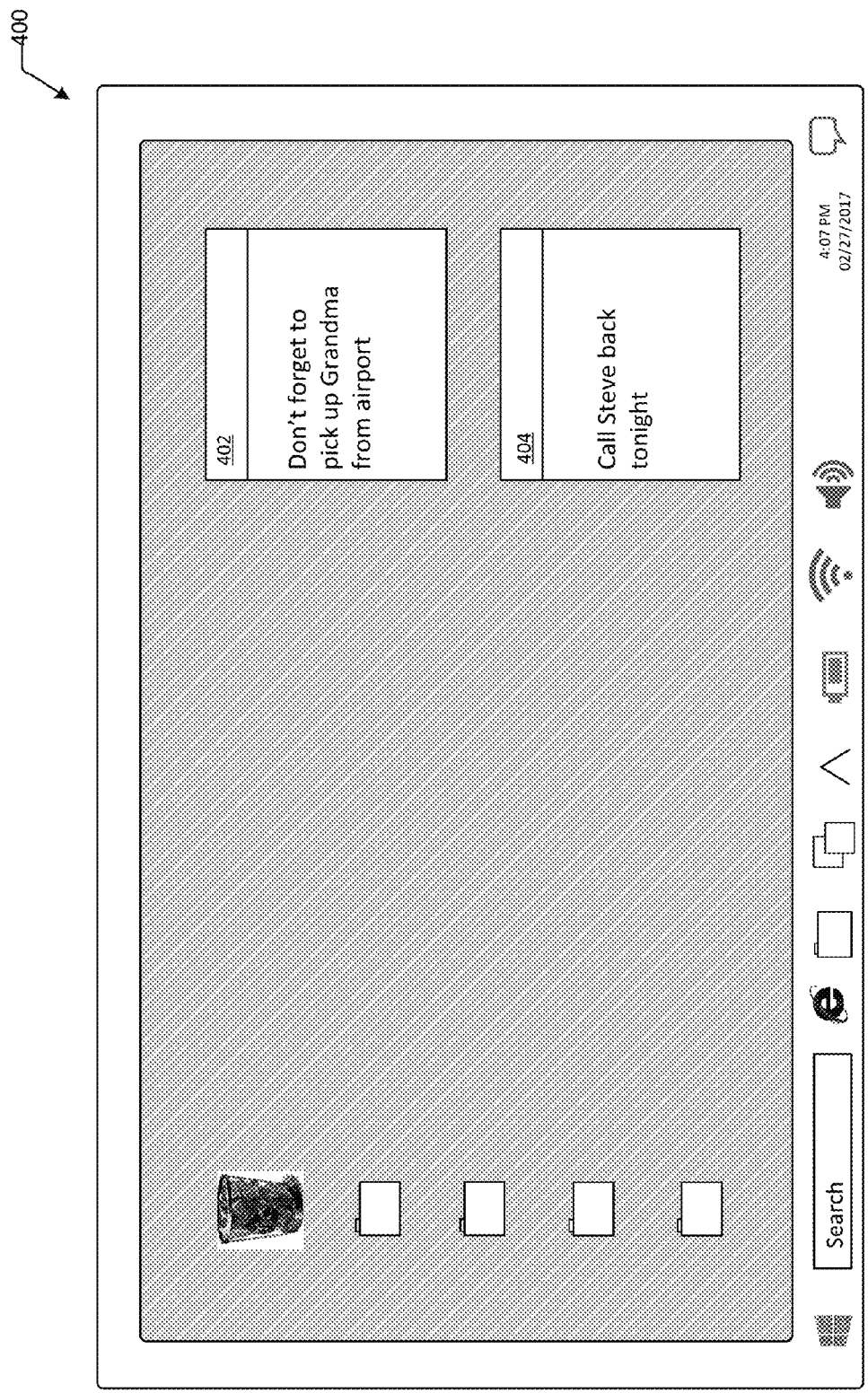
FIG. 4 illustrates an example of an application utilizing smart reminders.

FIG. 4 illustrates an example of an application utilizing smart reminders. Specifically, FIG. 4 is a screenshot of an operating system running a note-taking application such as Microsoft® Sticky Notes™. Within Microsoft® Sticky Notes™, a smart reminder may be created. For example, sticky note 402 and sticky note 404 may be processed as smart reminders, as described above, instead of simply sticky notes. As described in FIG. 2, the textual input of the sticky note may be processed to generate a smart reminder. Key phrases associated with action directives, such as "Don't forget," "Tell," "Call," and "Remind," etc., may indicate to the system that the user desires to be reminded of this sticky note upon a subsequent triggering event (e.g., receiving a phone call from a person associated with the sticky note). For example, a user may create sticky note 404, which states: "Call Steve back tonight." Later that afternoon, the user may receive a call from Steve. Even though the sticky note 404 specifies to call Steve back "tonight," a smart reminder may be displayed on the screen of the device of the user when the incoming call from Steve is received in order to remind the user of the user's intention to call Steve back that evening. In this case, the user may convey any intended information to Steve now.

As should be appreciated, the various methods, devices, components, etc., described with respect to FIG. 4 are not intended to limit systems 400 to being performed by the particular components described. Accordingly, additional topology configurations may be used to practice the methods and systems herein and/or components described may be excluded without departing from the methods and systems disclosed herein.

Figure 5B:
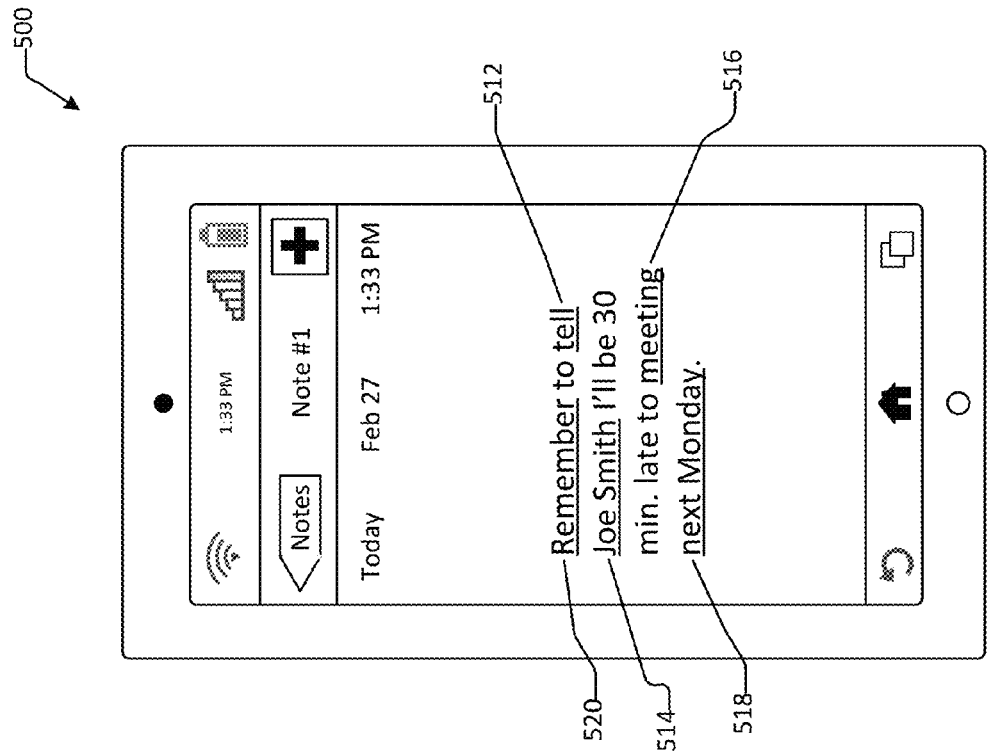
FIG. 5B illustrates an example of an application processing a smart reminder.
Figure 5A:
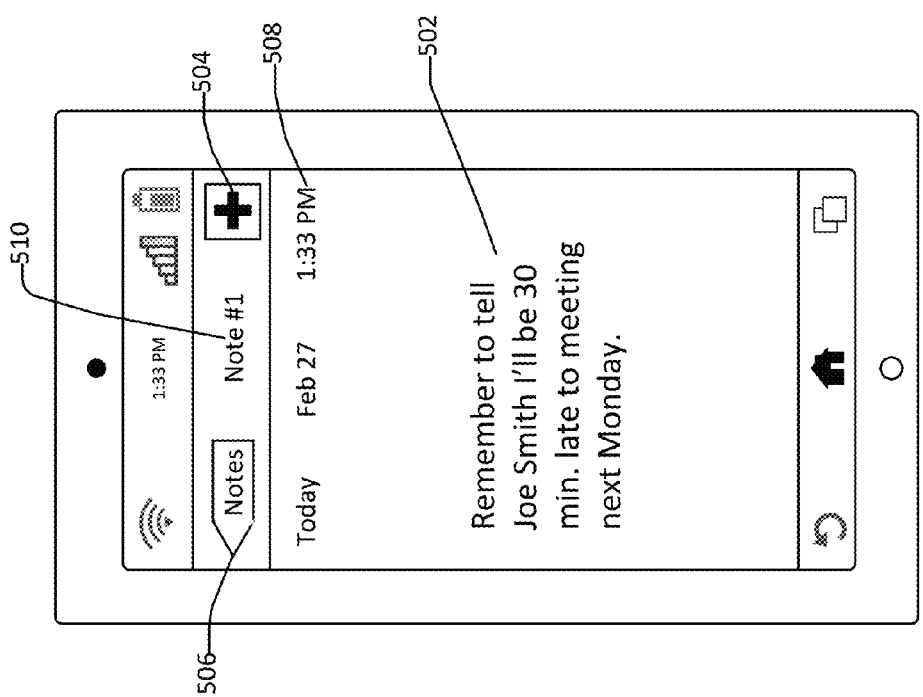
FIG. 5A illustrates an example of an application receiving a smart reminder.

FIG. 5A illustrates an example of an application for receiving input that may be converted to a smart reminder. In some example aspects, a mobile phone may be running a notes application that facilitates the receipt and processing of input and the creation and display of smart reminders. For example, a user may enter input in the input area 502 of the notes application. A user may specify creating a new note using the "add" button 504. In some aspects, the title of the note 510 may be edited, and the user may desire to view all created notes by selecting the back button 506. In aspects, receiving textual input associated with a new note occurs during a receive input operation 102, as described with reference to FIG. 1. After the input is received, it may then be processed and converted into a smart reminder.

FIG. 5B illustrates an example of an application processing a smart reminder. As illustrated, certain key words in the textual input are isolated (indicated by the underlining). The smart reminder system may first determine if the user intended the input to serve as a smart reminder. As described in FIG. 2, one aspect of determining if the input is intended to serve as a smart reminder is to isolate key words (as indicated by the underline). For example, action directives such as the underlined word 520 "Remember," combined with the underlined word 512 "tell," may be compared against a previous set of data within the natural language processor 204 from FIG. 2. The natural language processor 204 may then determine that this input was intended to be a smart reminder. The underlined name 514 "Joe Smith" may be associated with a contact in an address book of the user. In some example aspects, a user may have contact entries that share the same first and last names. In such scenarios, the smart reminder system may consider other contextual cues. For example, the smart reminder system may consider the underlined word 516 "meeting" and the underlined date 518 "next Monday" to determine that the input is associated with a work domain. In this example, the smart reminder system may associate the underlined named 514 "Joe Smith" with a work contact named "Joe Smith" within the address book of the user.

As should be appreciated, the various methods, devices, components, etc., described with respect to FIG. 5A and FIG. 5B are not intended to limit systems 500 to being performed by the particular components described. Accordingly, additional topology configurations may be used to practice the methods and systems herein and/or components described may be excluded without departing from the methods and systems disclosed herein.

Figure 6A:
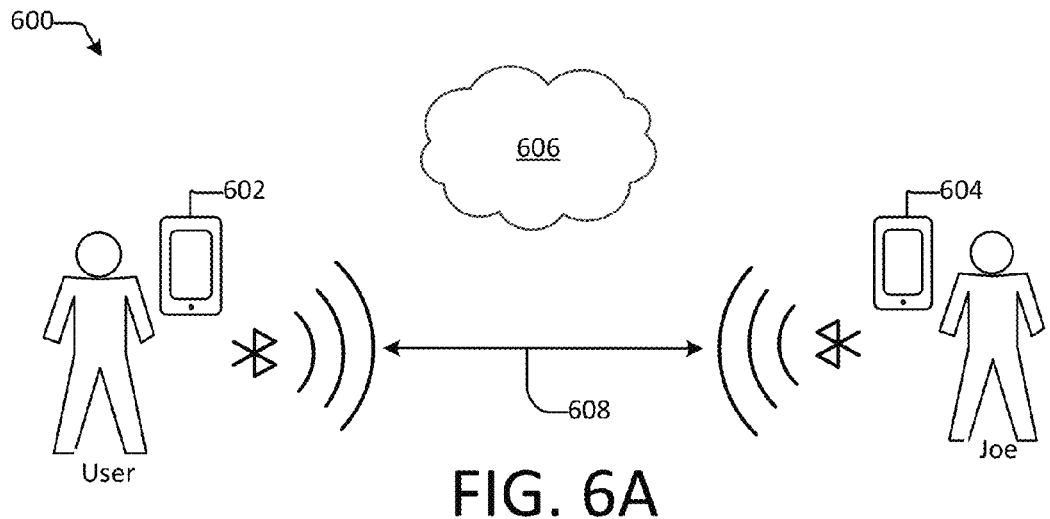
FIG. 6A illustrates an example of a smart reminder triggering event associated with device proximity.

FIG. 6A illustrates an example of a smart reminder triggering event associated with device proximity. In some example aspects, a triggering event for a smart reminder may occur when a device associated with a smart reminder is nearby. For example, device 602 and device 604 may be connected to the same network 606. If the device 602 includes a smart reminder associated with a person registered to device 604, the simultaneous connection of devices 602 and 604 to network 606 may trigger the display of the smart reminder on device 602.

In other example aspects, device 602 may be listening to Bluetooth signals emitted from device 604. If device 602 captures a Bluetooth signal from device 604, then device 602 and device 604 may establish a Bluetooth connection 608. Such a connection may trigger the display of a smart reminder on device 602.

Figure 6B:
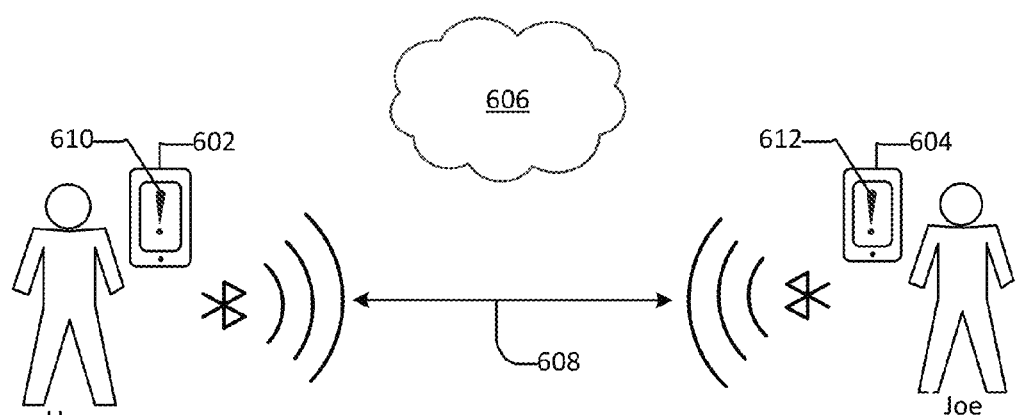
FIG. 6B illustrates an example of an application responding to a smart reminder triggering event associated with device proximity.

FIG. 6B illustrates an example of an application responding to a smart reminder triggering event associated with device proximity. As previously described, once device 602 and device 604 are connected to a shared network 606, a smart reminder 610 may display on device 602. In some example aspects, the device 604 registered to the intended recipient of the smart reminder may also receive a smart reminder 612, alerting the user that the user of device 602 desires to convey information to the recipient.

Figure 6C:
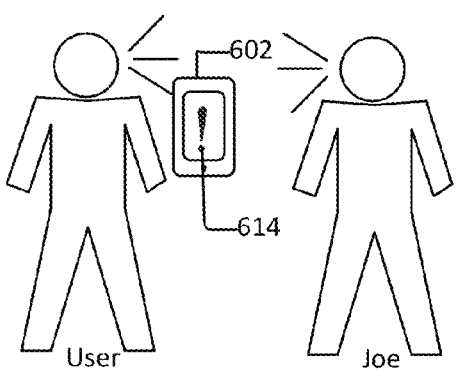
FIG. 6C illustrates an example of an application responding to a smart reminder triggering event associated with at least one of voice recognition, facial recognition, and natural language processing.

FIG. 6C illustrates an example of an application responding to a smart reminder triggering event detecting a person by at least one of voice recognition, facial recognition, and/or natural language processing. In some example aspects, the creator of a smart reminder may randomly and unexpectedly run into a person associated with the smart reminder. During the course of the interaction between the user and associated person, the device of the user may listen to the conversation (e.g., using a microphone and speech-to-text processing) and utilize natural language processing technology to determine that the person speaking to the user is a person associated with a smart reminder. In other example aspects, the device of the owner may listen to the voice of the associated person (e.g., using a microphone) and utilize voice recognition technology to determine that the person speaking to the user is a person associated with a smart reminder. In further example aspects, the device of the owner may capture facial features of the associated person (e.g., using a camera) and match those facial features with a person associated with a smart reminder. In any of the aforementioned scenarios, a smart reminder 614 may be triggered and displayed on the device of the user, reminding the user of the reminder associated with the person currently engaging the user in conversation.

As should be appreciated, the various methods, devices, components, etc., described with respect to FIG. 6A, FIG. 6B, and FIG. 6C are not intended to limit systems 600 to being performed by the particular components described. Accordingly, additional topology configurations may be used to practice the methods and systems herein and/or components described may be excluded without departing from the methods and systems disclosed herein.

FIGS. 7A-7D illustrate examples of an application responding to a smart reminder triggering event associated with an incoming call or an incoming text. As illustrated by FIGS. 7A and 7B, a user may receive an incoming call 702 on a device 700. The user may have the option to accept 704 the incoming call 702 or decline 706 the incoming call 702. However, in some aspects, before the user accepts 704 or declines 706 the incoming call 702, a smart reminder 708 may be triggered and displayed on the screen of the device 700. For example, the smart reminder 708 may indicate: "Tell Joe Smith that you will be 30 min. late to meeting next Monday." As illustrated, the incoming call 702 from Joe Smith 710 is a trigger event for a smart reminder 708 associated with Joe Smith. Thus, as a result of detecting the incoming call 702 from Joe Smith 710, the smart reminder 708 may be displayed on the screen of the device 700.

Similarly, as illustrated by FIGS. 7C and 7D, a user may receive an incoming text 714 from Joe Smith 712 on a device 700. In this case, a smart reminder 716 may indicate: "Tell Joe Smith that you will be 30 min. late to meeting next Monday." As illustrated, the incoming text 714 from Joe Smith 712 is a trigger event for the smart reminder 716 associated with Joe Smith. Thus, as a result of detecting the incoming text 714 from Joe Smith 712, the smart reminder 716 may be displayed on the screen of the device 700.

As should be appreciated, the various methods, devices, components, etc., described with respect to FIG. 7 are not intended to limit systems 700 to being performed by the particular components described. Accordingly, additional topology configurations may be used to practice the methods and systems herein and/or components described may be excluded without departing from the methods and systems disclosed herein.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, as described herein.

Figure 8:
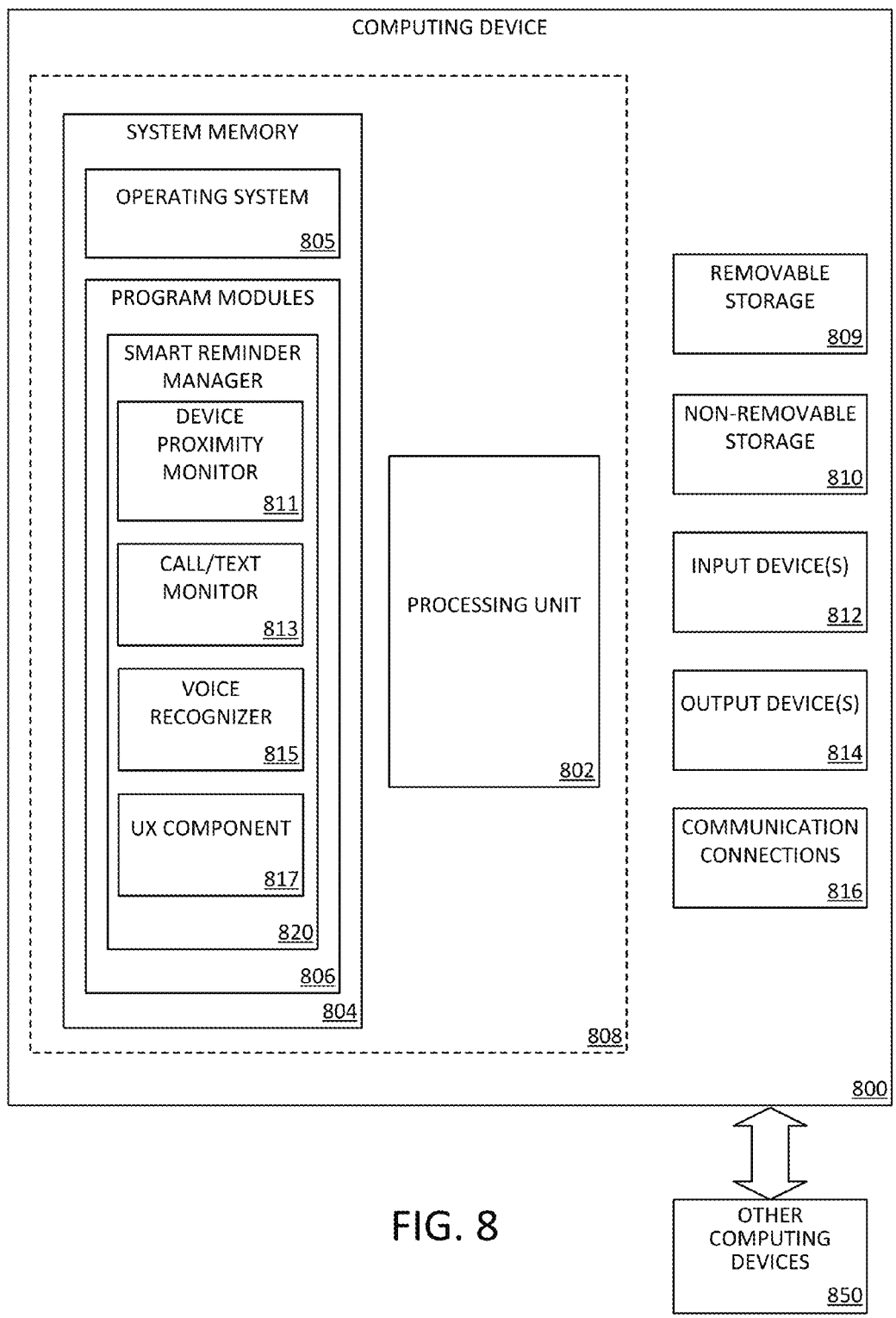
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for implementing a smart note reminder manager 820 on a computing device (e.g., server computing device and/or client computing device), including computer executable instructions for smart note reminder manager 820 that can be executed to implement the methods disclosed herein, including a method of creating and processing a smart note reminder on an electronic device. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running smart reminder manager 820, such as one or more components with regard to FIG. 1 and, in particular, a device proximity monitor 811, a call/text monitor 813, a voice recognizer 815, and/or UX Component 817.

The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., smart note reminder manager 820) may perform processes including, but not limited to, the aspects, as described herein. Other program modules that may be used in accordance with aspects of the present disclosure, and in particular for creating and processing a smart note reminder on an electronic device, may include a device proximity monitor 811, a call/text monitor 813, a voice recognizer 815, and/or UX Component 817, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
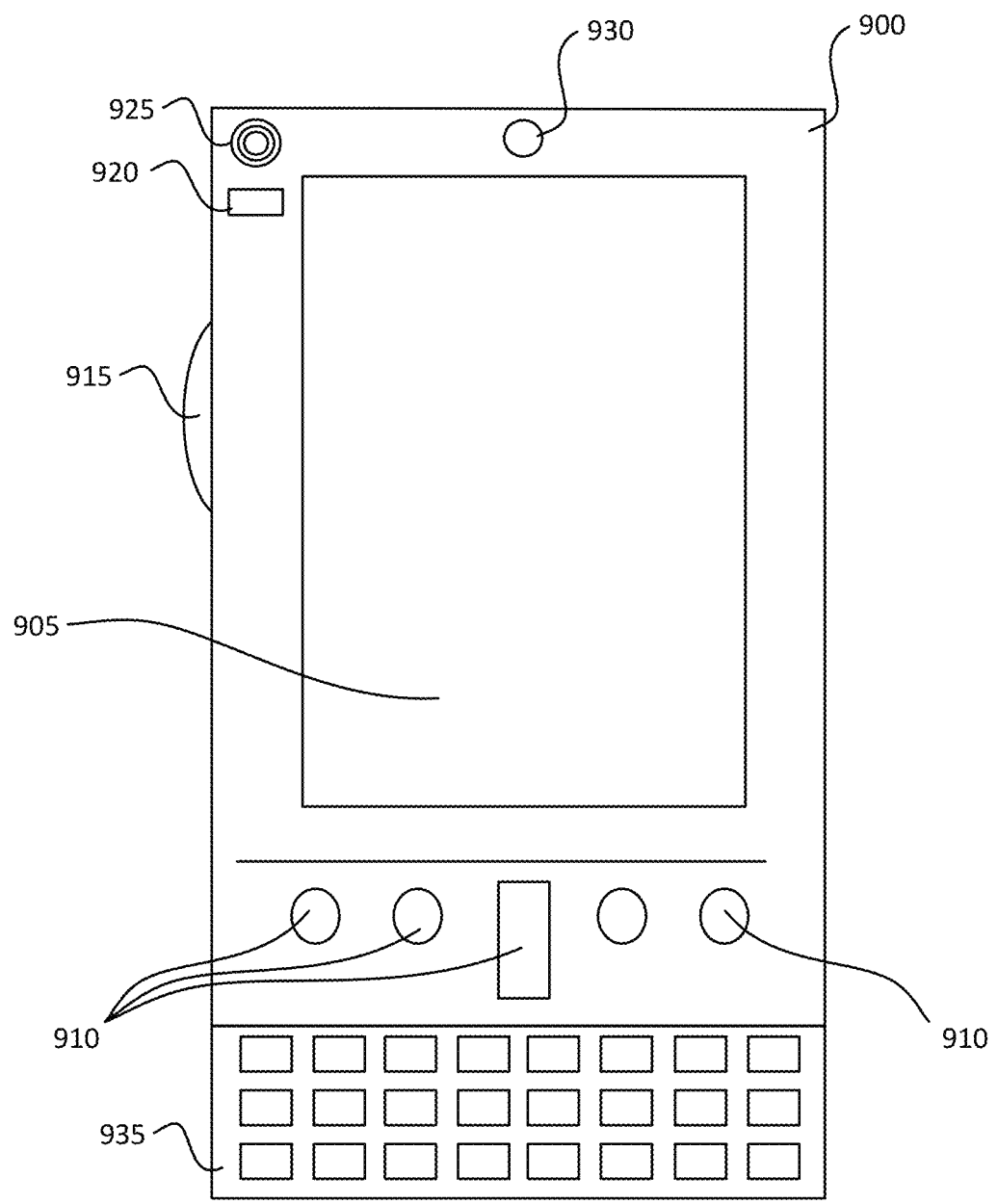
FIGS. 9A and 9B are simplified block diagrams of a mobile computing device with which aspects of the present disclosure may be practiced.
Figure 9B:
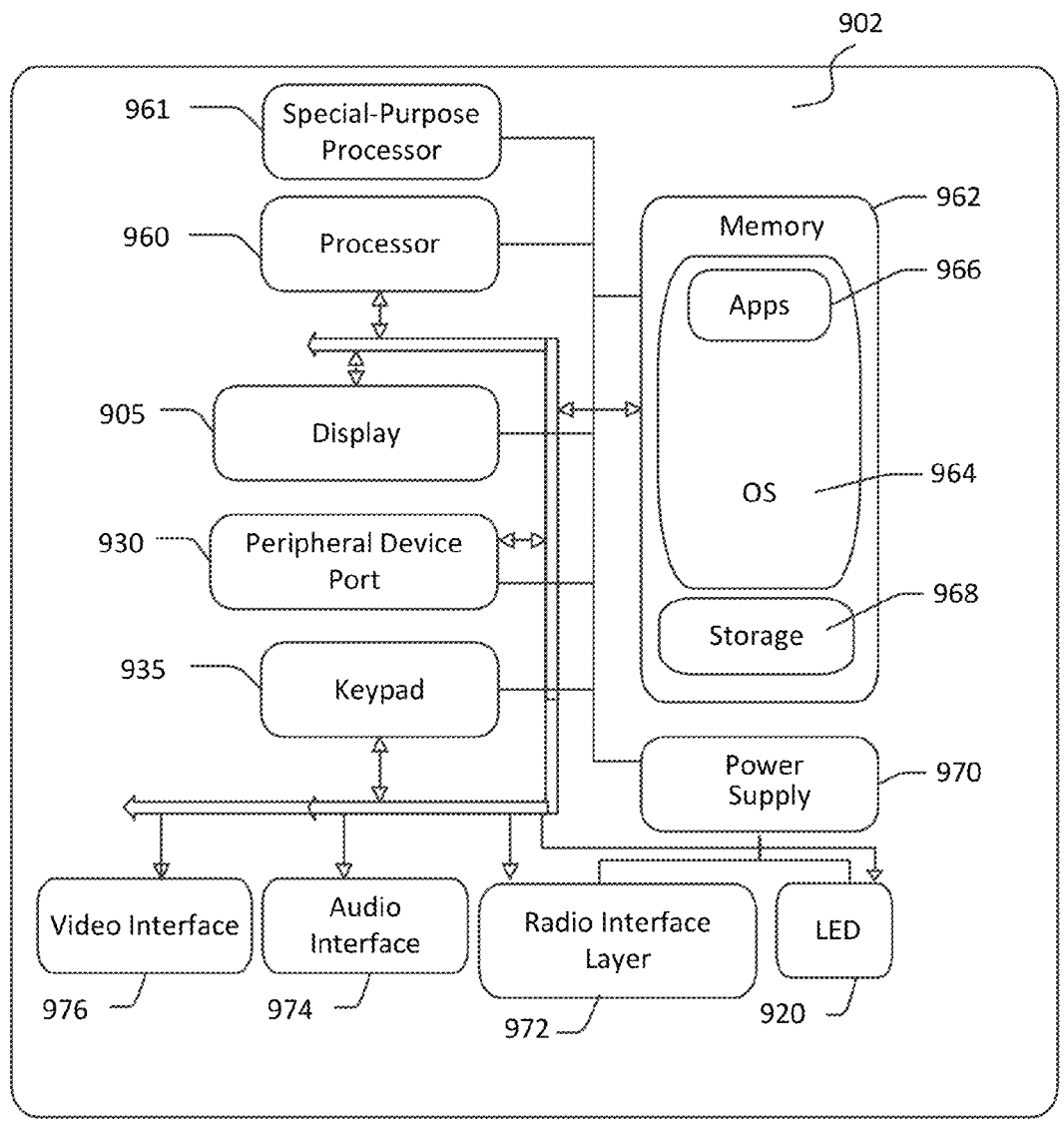

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including the instructions for creating and processing a smart note reminder on an electronic device described herein (e.g., smart reminder manager, Call/Text Monitor, Device Proximity Monitor, Voice Recognizer, and/or UX component, etc.).

The system 902 has a power supply 970, which may be implemented as one or more batteries. The power supply 970 may further include an external power source, such as an AC adapter or a powered docking cradle that supplements or recharges the batteries. The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 925 (e.g., audio transducer 925 illustrated in FIG. 9A). In the illustrated embodiment, the visual indicator 920 is a light emitting diode (LED) and the audio transducer 925 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 9A and 9B are described for purposes of illustrating the present methods and systems and are not intended to limit the disclosure to a particular sequence of steps or a particular combination of hardware or software components.

Figure 10:
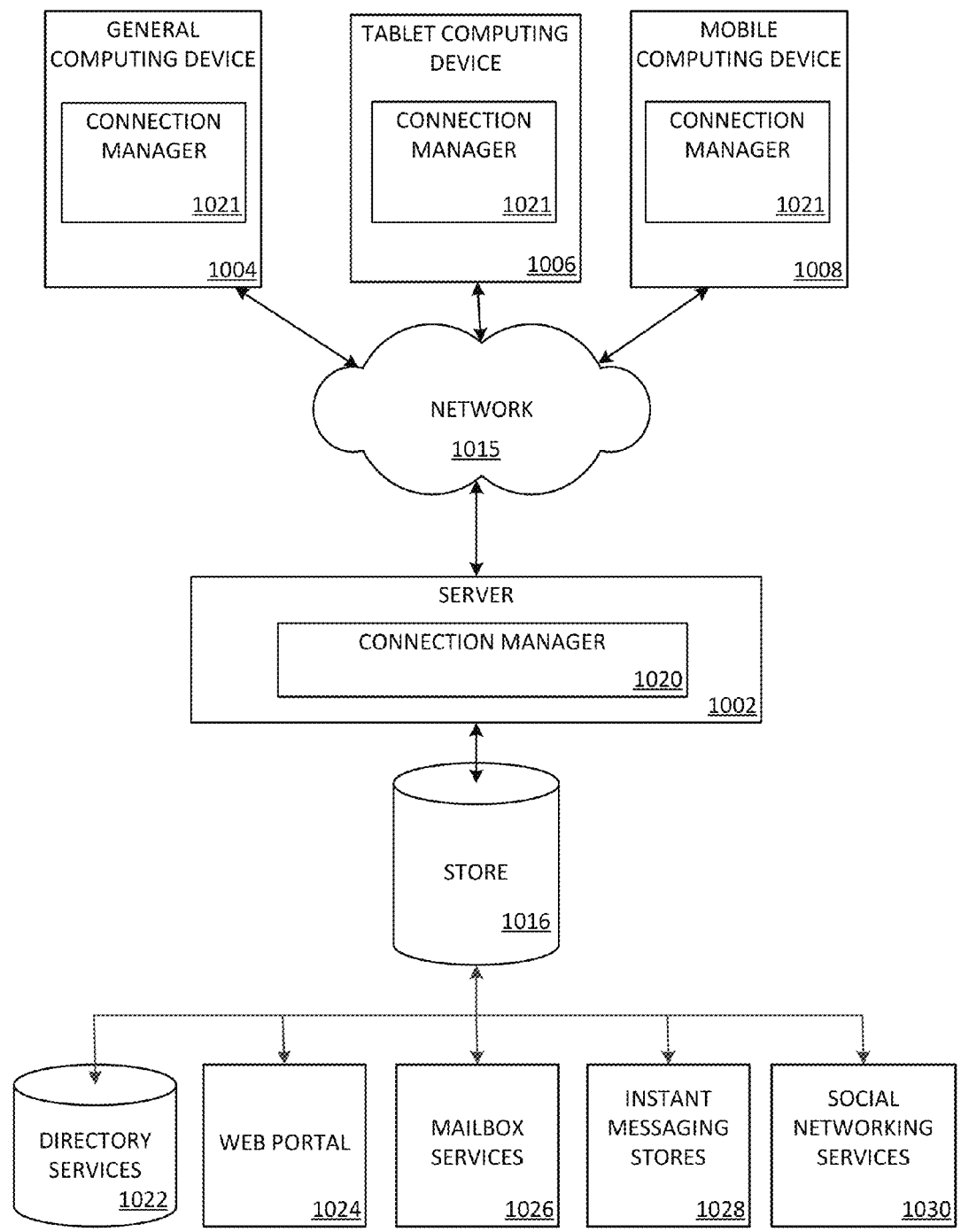
FIG. 10 is a simplified block diagram of a distributed computing system in which aspects of the present disclosure may be practiced.

FIG. 10 illustrates one aspect of the architecture of a system for processing data received at a computing system from a remote source, such as a general computing device 1004 (e.g., personal computer), tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking service 1030. The smart note reminder manager 1021 may be employed by a client that communicates with server device 1002, and/or the smart note reminder manager 1020 may be employed by server device 1002. The server device 1002 may provide data to and from a client computing device such as a general computing device 1004, a tablet computing device 1006 and/or a mobile computing device 1008 (e.g., a smart phone) through a network 1015. By way of example, the computer system described above with respect to FIGS. 1-9 may be embodied in a general computing device 1004 (e.g., personal computer), a tablet computing device 1006 and/or a mobile computing device 1008 (e.g., a smart phone). Any of these embodiments of the computing devices may obtain content from the store 1016, in addition to receiving graphical data useable to either be pre-processed at a graphic-originating system or post-processed at a receiving computing system.

As should be appreciated, FIG. 10 is described for purposes of illustrating the present methods and systems and is not intended to limit the disclosure to a particular sequence of steps or a particular combination of hardware or software components.

Figure 11:
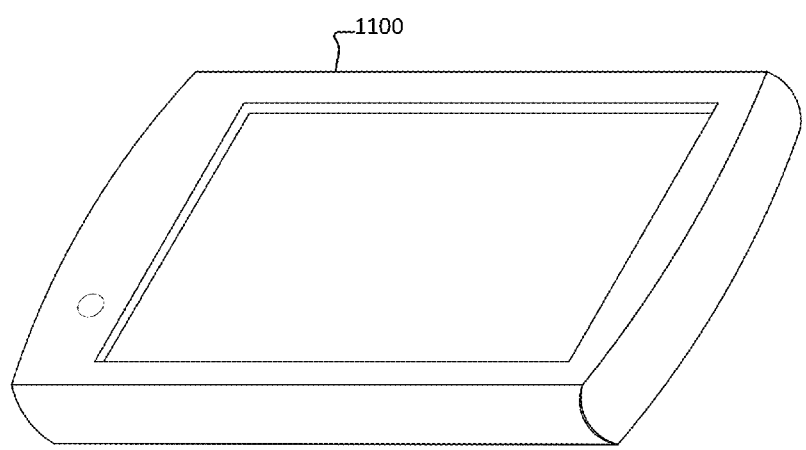
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 11 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method of creating a smart reminder, comprising:
   receiving a user input on a device;
   processing the user input, comprising:
      identifying one or more entities associated with the user input, wherein at least one entity is associated with a person; and
      identifying an action by semantically evaluating the user input to determine a user intention;
   based at least in part on the processed user input, automatically generating the smart reminder to perform the action;
   detecting at least one triggering event associated with the smart reminder, wherein detecting the triggering event comprises detecting the person; and
   based on detecting the at least one triggering event, providing the smart reminder on a display of the device.

2. The method of claim 1, wherein the user input comprises at least one of text-based input, speech-based input, stylus-based input and touch-based input.

3. The method of claim 1, wherein the device comprises at least one of: a mobile device, a tablet, a laptop computer, and a desktop computer.

4. The method of claim 1, wherein detecting the at least one triggering event comprises at least one of:
   detecting an incoming phone call from the person;
   detecting an outgoing phone call to the person;
   detecting an incoming text from the person;
   detecting an outgoing text to the person;
   detecting a device associated with the person; and
   detecting a voice of the person.

5. The method of claim 1, wherein the at least one triggering event is one of an incoming phone call from the person and an outgoing call to the person, and wherein the smart reminder is displayed in response to detecting one of the incoming phone call and the outgoing phone call.

6. The method of claim 5, wherein the at least one triggering event is an incoming phone call from the person, and wherein the smart reminder is provided on the display of the device prior to answering the incoming call.

7. The method of claim 1, wherein the at least one triggering event is an incoming text from the person, and wherein the smart reminder is displayed in response to detecting the incoming text.

8. The method of claim 1, wherein detecting the at least one triggering event comprises detecting that a device associated with the person is connected to the same local-area network as a device associated with the smart reminder.

9. The method of claim 1, wherein detecting the at least one triggering event comprises detecting a voice of the person associated with the smart reminder.

10. The method of claim 1, wherein processing the input further comprises utilizing a natural language processor.

11. The method of claim 10, wherein utilizing the natural language processor comprises parsing the user input for key words and phrases to identify the one or more entities.

12. A computing device, comprising:
   at least one processing unit; and
   at least one memory storing computer-executable instructions that when executed by the at least one processing unit cause the computing device to:
      receive a user input;
      process the user input, comprising:
         identifying one or more entities associated with the user input, wherein at least one entity is associated with a person; and
         identifying an action by semantically evaluating the user input to determine a user intention;
      based at least in part on the processed user input, automatically generate the smart reminder to perform the action;
      detect at least one triggering event associated with the smart reminder, wherein detecting the triggering event comprises detecting a communication associated with the person; and based on detecting the at least one triggering event, provide the smart reminder on a display of the computing device.

13. The computing device of claim 12, wherein the user input comprises at least one of text-based input, speech-based input, stylus-based input and touch-based input.

14. The computing device of claim 12, wherein the computing device comprises at least one of: a mobile device, a tablet, a laptop computer, and a desktop computer.

15. The computing device of claim 12, wherein the communication associated with the person is an incoming phone call, and wherein the smart reminder is displayed in response to detecting the incoming phone call.

16. The computing device of claim 15, wherein the smart reminder is provided on the display of the computing device when the triggering event is detected.

17. The computing device of claim 12, wherein the communication associated with the person is an incoming text, and wherein the smart reminder is displayed in response to detecting the incoming text.

18. A computer storage device storing computer-executable instructions that when executed by a processing unit perform a method, comprising:
   receiving a user input on a device;
   processing the user input, comprising:
      identifying one or more entities associated with the user input, wherein at least one entity is associated with a person; and
      analyzing the user input for contextual cues and key words to identify a plurality of actions;
   based at least in part on the processed user input, automatically generating a plurality of smart reminders, wherein each smart reminder is associated with at least one of the plurality of actions;
   detecting at least one triggering event associated with at least one smart reminder of the plurality of smart reminders, wherein detecting the triggering event comprises detecting the person; and
   based on detecting the at least one triggering event, providing the at least one smart reminder on a display of the device.

19. The computer storage device of claim 18, wherein detecting the at least one triggering event comprises at least one of:
   detecting an incoming phone call from the person;
   detecting an outgoing phone call to the person;
   detecting an incoming text from the person;
   detecting an outgoing text to the person;
   detecting a device associated with the person; and
   detecting a voice of the person.

20. The computer storage device of claim 18, wherein the at least one triggering event is an incoming phone call from the person, and wherein the smart reminder is displayed in response to detecting the incoming phone call.

* * * * *